US010992726B2

(12) United States Patent
Niuwenhuys et al.

(10) Patent No.: US 10,992,726 B2
(45) Date of Patent: Apr. 27, 2021

(54) DETECTING SENSOR-BASED INTERACTIONS WITH CLIENT DEVICE IN CONJUNCTION WITH PRESENTATION OF CONTENT

(71) Applicant: AdsWizz Inc., San Mateo, CA (US)

(72) Inventors: Bruno Niuwenhuys, Sunnyvale, CA (US); Bogdan Bocşe, Bucharest (RO); Mihai Ciurea, Bucharest (RO); Caba Ciprian, Bucharest (RO); Guzik Dumitru Florin, Slobozia (RO)

(73) Assignee: ADSWIZZ INC., San Mateo, CA (US)

( * ) Notice: Subject to any disclaimer, the term of this patent is extended or adjusted under 35 U.S.C. 154(b) by 796 days.

(21) Appl. No.: 15/338,236

(22) Filed: Oct. 28, 2016

(65) Prior Publication Data

US 2018/0034884 A1 Feb. 1, 2018

(30) Foreign Application Priority Data

Aug. 1, 2016 (RO) .............................. a 2016 00550

(51) Int. Cl.
*H04L 29/06* (2006.01)
*H04L 29/08* (2006.01)
*G06F 3/00* (2006.01)

(52) U.S. Cl.
CPC .............. *H04L 65/607* (2013.01); *G06F 3/00* (2013.01); *H04L 67/12* (2013.01); *H04L 67/22* (2013.01)

(58) Field of Classification Search
CPC ............ G06F 3/00; H04L 67/12; H04L 67/22
See application file for complete search history.

(56) References Cited

U.S. PATENT DOCUMENTS

| | | | |
|---|---|---|---|
| 6,505,169 B1 | 1/2003 | Bhagavath et al. | |
| 6,941,001 B1* | 9/2005 | Bolle ..................... | G06F 1/1616 382/115 |
| 8,281,332 B2* | 10/2012 | Rajaraman ............. | G06Q 30/02 705/14.4 |
| 8,433,611 B2* | 4/2013 | Lax ....................... | H04N 21/435 705/14.4 |
| 8,503,982 B2* | 8/2013 | Nakao ..................... | H04M 1/67 455/411 |

(Continued)

OTHER PUBLICATIONS

PCT International Search Report and Written Opinion, PCT Application No. PCT/US2016/061655, dated Jan. 6, 2017, 12 pages.

*Primary Examiner* — David P Zarka
(74) *Attorney, Agent, or Firm* — Fenwick & West LLP

(57) ABSTRACT

A content replacement system sends a content item with one or more content replacement parts to be consumed by a user of a client device. The content item is further associated with an interaction pattern that corresponds to a particular user interaction and a defined action that is to be executed by the client device when the particular user interaction is performed on the client device. While the content replacement part is played on the client device, one or more sensors of the client device acquire data regarding user interactions performed by the user on the client device. The acquired data is processed to determine whether the user has performed a user interaction that matches the interaction pattern. Upon detecting a match, the client device sends a notification to the content replacement system indicating that the match has occurred and further executes the defined action.

18 Claims, 7 Drawing Sheets

(56) References Cited

U.S. PATENT DOCUMENTS

| | | | | |
|---|---|---|---|---|
| 8,625,974 B1 * | 1/2014 | Pinson | | H04N 5/783 |
| | | | | 386/350 |
| 8,683,547 B2 * | 3/2014 | Apparao | | G06Q 10/06 |
| | | | | 726/1 |
| 8,719,865 B2 * | 5/2014 | Moonka | | G11B 27/11 |
| | | | | 725/42 |
| 8,996,712 B2 | 3/2015 | Green et al. | | |
| 9,996,847 B2 * | 6/2018 | Sargin | | H04W 4/14 |
| 10,013,546 B1 * | 7/2018 | Johansson | | G06F 21/36 |
| 10,475,066 B1 * | 11/2019 | Kakani | | G06Q 30/0275 |
| 2007/0204310 A1 * | 8/2007 | Hua | | H04N 7/17318 |
| | | | | 725/88 |
| 2008/0066107 A1 * | 3/2008 | Moonka | | G11B 27/11 |
| | | | | 725/42 |
| 2008/0115161 A1 * | 5/2008 | Kurzion | | G06Q 30/02 |
| | | | | 725/32 |
| 2008/0165133 A1 * | 7/2008 | Blumenberg | | G06F 3/0482 |
| | | | | 345/173 |
| 2010/0010893 A1 * | 1/2010 | Rajaraman | | G06Q 30/0253 |
| | | | | 705/14.51 |
| 2010/0251289 A1 | 9/2010 | Agarwal et al. | | |
| 2012/0271883 A1 * | 10/2012 | Montoya | | H04W 4/023 |
| | | | | 709/204 |
| 2013/0073384 A1 * | 3/2013 | Qiu | | H04L 65/4084 |
| | | | | 705/14.49 |
| 2014/0074959 A1 * | 3/2014 | Alsina | | H04H 60/46 |
| | | | | 709/213 |
| 2014/0096169 A1 | 4/2014 | Dodson et al. | | |
| 2014/0181243 A1 | 6/2014 | Nieuwenhuys | | |
| 2014/0245161 A1 * | 8/2014 | Yuen | | H04W 4/21 |
| | | | | 715/736 |
| 2014/0259059 A1 | 9/2014 | Evans et al. | | |
| 2014/0310805 A1 * | 10/2014 | Kandekar | | G06F 21/36 |
| | | | | 726/19 |
| 2014/0315513 A1 * | 10/2014 | Long | | H04W 4/90 |
| | | | | 455/404.2 |
| 2015/0051981 A1 * | 2/2015 | Ge | | G06Q 50/01 |
| | | | | 705/14.66 |
| 2015/0052196 A1 * | 2/2015 | Emerson, III | | H04L 67/10 |
| | | | | 709/203 |
| 2015/0149930 A1 * | 5/2015 | Walkin | | H04L 65/403 |
| | | | | 715/753 |
| 2015/0208131 A1 * | 7/2015 | Chatter | | H04N 21/47815 |
| | | | | 725/60 |
| 2015/0356286 A1 * | 12/2015 | Quirk | | G06F 21/32 |
| | | | | 726/19 |
| 2016/0182434 A1 * | 6/2016 | Systrom | | H04L 51/32 |
| | | | | 709/206 |

* cited by examiner

DETECTING SENSOR-BASED INTERACTIONS WITH CLIENT DEVICE IN CONJUNCTION WITH PRESENTATION OF CONTENT

CROSS REFERENCE TO RELATED APPLICATION

This application claims the benefit of Romanian App. No. A/00550/2016, filed Aug. 1, 2016, which is hereby incorporated by reference in its entirety.

TECHNICAL FIELD

The disclosure generally relates to the field of online content distribution, and more specifically to detecting sensor-based interactions on a client device in conjunction with the presentation of content on the client device to a user.

BACKGROUND

The presentation of content items that include a request for a user interaction often occurs at inopportune times such as when a user is passively consuming media content that does not require user actions. Presented content items often require the user to provide user interactions that are disruptive to the user experience. For example, a user must unlock the client device, access the input interface (e.g. a touchscreen), and perform a prompted action in order to gain more information about the presented content item. This is a cumbersome process that may frustrate the user and may prevent the user altogether from expressing interest. The occurrence of this scenario is increasing in frequency as client devices, such as mobile cell phones, are now ubiquitous companions that enable users to engage in passive consumption of media content at higher rates.

As a result, users that may be interested in a content item are not able to express or fail to express their interest during the provided opportunity. Thus, content providers are unable to accurately measure the effectiveness of delivered content items as the lack of a user interaction with a content item may be due to the disruptive user experience (e.g., when a user fails to interact as described above) as opposed to the ineffectiveness of the content item. Therefore, it is necessary to develop novel methods for a user to provide user interactions without significantly disrupting the user experience.

SUMMARY

A method is disclosed for detecting user interest regarding a content item presented on a client device. In particular, the method enables a user of a client device to directly express interest in a content item without having to undergo a process of unlocking or access an application that presents the content item. This improves the user experience for a user that desires to express interest in a content item.

A content replacement system receives original content items from a third party system and may replace parts of the original content with content replacement parts that are specifically selected for a user on a client device. The content replacement system sends the content item with the content replacement parts to the client device to be presented to the user. For each content item with content replacement parts, the content replacement system also sends, to the client device, an interaction pattern that corresponds to a particular user interaction. The interaction pattern may correspond to a user interaction that includes, but is not limited to shaking the device, tapping on the case of the device, or tilting the device in a particular orientation.

The client device presents the original content item with content replacement parts to the user. The user may passively consume the original content item. When the client device plays a content replacement part in the content item, the content replacement part may instruct the user to perform a particular user interaction if the user is interested in receiving more information regarding the content replacement part. During the same time as when the content replacement part is playing on the client device, the client device records user interactions performed by the user on the client device. User interactions are detected by one or more sensors of the client device and the acquired data from the sensors is stored in a memory of the client device.

In various embodiments, the client device processes the acquired data to determine whether the user has performed the particular user action specified by the content replacement part. The client device extracts features of the acquired data and compares the extracted features to the interaction pattern. In various embodiments, the processing and comparing of the acquired data to the interaction pattern may be conducted by the content replacement system.

If a match occurs, indicating that the user has performed the particular user action and is interested in the content replacement part, the client device sends a notification to the content replacement system that the match has occurred. Additionally, the client device executes a defined action in response to the matching. For example, a defined action may be a request sent by the client device to retrieve a web page that contains more information regarding the content replacement part that the user showed interest in. Therefore, the user can express interest (e.g. provide a user interaction) in a content replacement part while the content replacement part is playing, and, at a subsequent time, access an additional web page regarding the content replacement part.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
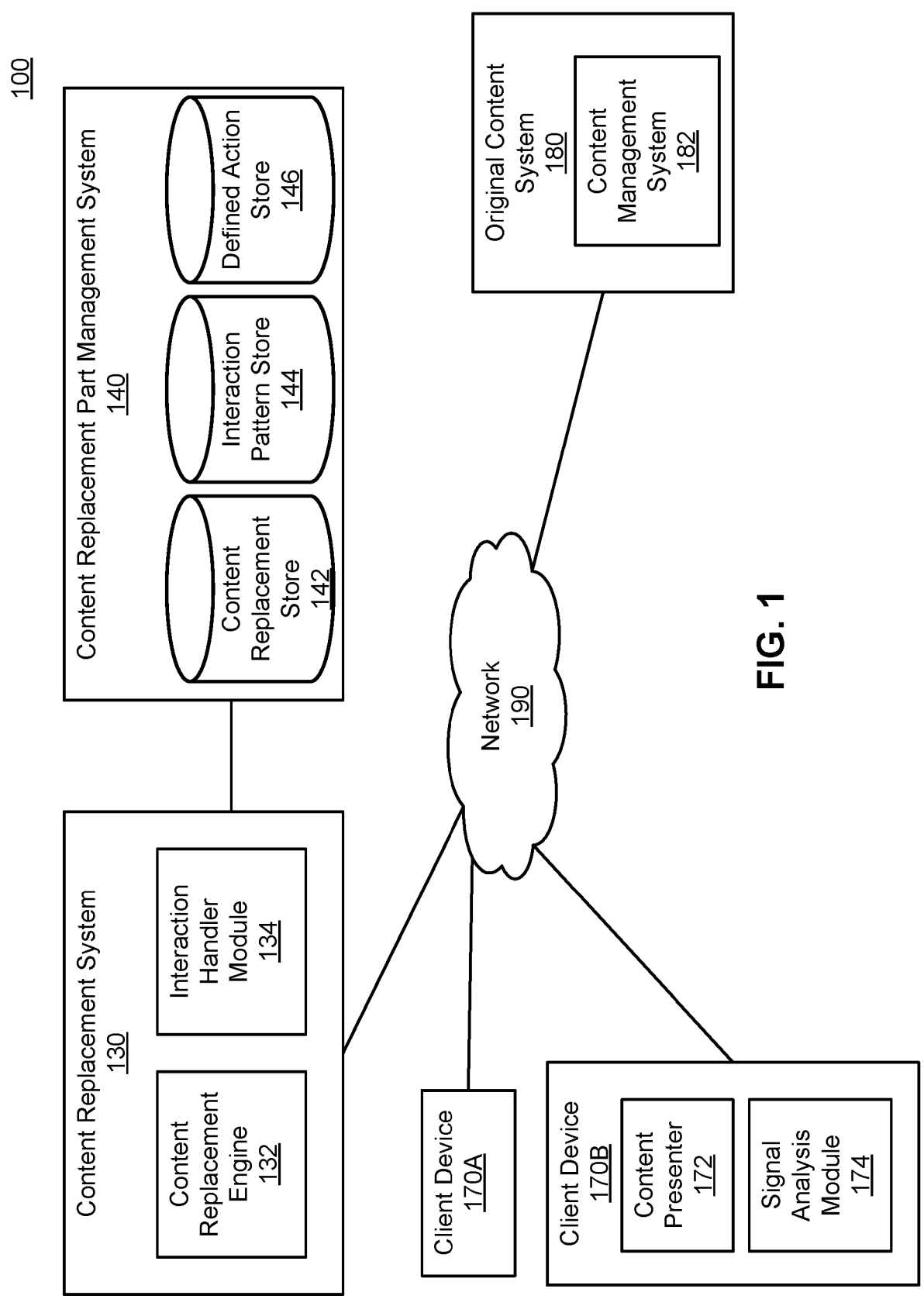
FIG. 1 illustrates an example environment for detecting user interest associated with a delivered content item, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is a system for identifying user interest in a delivered content item, such as an audio content item. A content replacement system receives original content from a third party content provider. In one embodiment, the original content includes break markers. The content replacement system identifies content replacement parts and modifies the original content by inserting the content replacement parts at the beginning of the break markers. Each of these content replacement parts may also be provided by a third party content provider, and each content replacement part has durations within a single range of values. In some embodiments, the original content and the content replacement parts are provided by two different third party content providers.

The content replacement system further receives an interaction pattern for each content replacement part in the content item. Additionally, the content replacement system receives a defined action that is to be executed when the interaction pattern is matched. The content replacement system transmits the content item with the replacement parts, the interaction pattern, and the defined action to a client device.

A client device receives the content item, the interaction pattern, and the defined action and proceeds to playback the content item. The client device recognizes the break markers indicating the replacement parts in the content item and activates the sensors of the client device to detect user interactions while the replacement parts are playing. In various embodiments, the client device compares the detected user inputs to the received interaction pattern to determine whether there is a match. If a match is detected, the client device executes the received defined action. In other embodiments, the client device provides the detected user inputs to the content replacement system for further analysis.

Upon execution of the received defined action, the client device provides a notification to the content replacement system that indicates a match with the interaction pattern occurred and that the defined action was executed.

Example System for Detecting User Interest in a Delivered Content Item

Figure (FIG. 1 an example environment 100 for detecting user interest associated with a delivered content item, according to an embodiment. The environment 100 includes the network 190, one or more client devices 170, a content replacement system 130, a content replacement part management system 140, and an original content system 180. Although the illustrated environment 100 may include the elements shown in FIG. 1, in other embodiments the environment 100 may include different elements. Furthermore, the functionalities of each element may be distributed differently among the elements in other embodiments.

FIG. 1 and the other figures use like reference numerals to identify like elements. A letter after a reference numeral, such as "170A," indicates that the text refers specifically to the element having that particular reference numeral. A reference numeral in the text without a following letter, such as "170," refers to any or all of the elements in the figures bearing that reference numeral (e.g. a reference numeral "170" in the text refers to reference numerals "170A" and/or "170B" in the figures).

Example Network

The network 190, which can be wired, wireless, or a combination thereof, enables communications among the client devices 170, the content replacement system 130, the content replacement part management system 140, and the original content system 180, and may include the Internet, a local area network (LAN), virtual LAN (VLAN) (e.g., with VPN), wide area network (WAN), or other network. In one example embodiment, the network 190 uses standard communications technologies and/or protocols, such as Hypertext Transfer Protocol (HTTP), Transmission Control Protocol/Internet Protocol (TCP/IP), Uniform Resource Locators (URLs), and the Doman Name System (DNS). In another example embodiment, the entities can use custom and/or dedicated data communications technologies instead of, or in addition to, the ones described above.

Example Original Content System

The original content system 180 is configured to transmit original content items to destination systems, such as the content replacement system 130. As used hereafter, an original content item refers to a content item that may originally be created or received by the original content system 180. Subsequently, the original content item is transmitted to the content replacement system 130 by the original content system 180. As one example, the content item is an audio content item and may be in any audio format, such as MP3. The original content system 180 transmits the content item to the content replacement system 130 along with metadata, such as a description of the content, program or content guide, technical specifications (e.g., format, bit rate), content author, and so on. In one embodiment, instead of being a separate system, the original content system 180 is the same system as the content replacement system 130.

In various embodiments, the original content system 180 includes a content management system 182. The content management system 182 is responsible for inserting one or more break markers in the original content item that specify a content replacement break in the original content item. Each content replacement break is a section of the original content item that may be specified by a start time point indicator and an end time point indicator. These indicators may be transmitted along with the original content item, either within the metadata of the original content item or within the original content item itself.

In the case where the indicators are transmitted in the metadata, the content management system 182 may insert a specific, digital marker (digital flag) in the digitally encoded frame of the original content item to represent a start and an end of the content replacement break section. Such a digital flag should be defined by the chosen digital encoding format of the content item without altering the playback sound and without corrupting the format of the protocol. In one embodiment, the content item uses an MPEG (Moving Pictures Experts Group) format, and the content management system 182 modifies the private bit and/or the copyright bit of the MPEG frame for the start and end of the content replacement break, without altering the encoded sounded or the expected behavior of the MPEG format for the content item.

In the case where the indicators are transmitted in the original content item itself, the content management system 182 may mark the start and end of the content replacement break sections in the content item with a preset audible sound indicator (e.g., a "jingle"), which can span up to several seconds. In one embodiment, different audible sounds can be used to represent the beginning and the end of the content replacement break. In one embodiment, instead of inserting an audible sound as an indicator, the content management system 182 inserts a preset inaudible sound at a predetermined frequency to represent the start and the end of the content replacement break.

In one embodiment, the content management system 182 uses a combination of the above described methods in order to indicate the start and end of content replacement breaks.

Example Content Replacement Part Management System

The content replacement part management system 140 may be configured to respond to requests for content replacement parts. The content replacement part management system 140 may include a content replacement store 142.

The content replacement store 142 stores content replacement parts which include content that differ from the original content items from the original content system 180. For example, a content replacement part may be a sponsored audio item provided by a sponsored content provider, which may be inserted into an audio content item (e.g. original content item). The content replacement store 142 may store with each content replacement part various metadata regarding that content replacement part. The metadata may include information regarding the targeting criteria for the content replacement part. The targeting criteria specify which users should be presented with the content replacement part, and may be specified by the content provider that provided the content replacement part to the content replacement part management system 140. The targeting criteria for each content replacement part may include specific geographic criteria (e.g., location, language), demographic criteria (e.g., age range, gender), content items in which the content replacement part should be inserted (e.g., content items with certain genre characteristics), device criteria (e.g., mobile device only), and/or user profile criteria (e.g., users with certain characteristics stored in a profile for the user).

The content replacement part management system 140 may receive a request from the content replacement system 130 for one or more content replacement parts. In various embodiments, the content replacement part management system 140 also receives information regarding a content item to be presented to a client device of a user, and various characteristics regarding the user and the user's client device. In response, the content replacement part management system 140 may transmit the one or more content replacement parts with targeting criteria matching the characteristics of the content item, user, and/or client device.

In one example embodiment, the content replacement part management system 140 retrieves the content replacement parts directly from the content providers of the content replacement parts (e.g., sponsored content providers or other third parties). The content replacement part management system 140 may transmit the characteristics of the user, content item, client device, and/or other information (which may be stripped of personally identifiable information) to the content providers, which may respond with a content replacement part. The content replacement part management system 140 may select from the responses a list of content replacement parts with the highest bid values.

In various embodiments, the content replacement part management system 140 stores a variety of interaction patterns in the interaction pattern store 144 in local memory. An interaction pattern specifies a signal that is detectable by a sensor of a client device, the signal corresponding to a user interaction performed by a user on the client device. In some embodiments, the interaction pattern specifies a continuous or discrete signal in the time domain. For example, an interaction pattern may specify a various signal amplitudes, and specify each signal amplitude with a corresponding time. In other embodiments, the interaction pattern may be Fourier coefficients or Cepstrum coefficients that specify a signal in the frequency domain.

Additionally, the interaction pattern may include or be associated with an instruction that specifies a sensor of the client device 170 that is to be used to detect a signal corresponding to a user interaction. For example, the instruction of the interaction pattern may specify a particular sensor of a client device. Certain interaction patterns may not be appropriate for certain client devices 170. A client device 170 that does not have an accelerometer will not be sent an interaction pattern that requires a user interaction corresponding to a "shake" of the client device 170. Instead, a different interaction pattern may be sent to that client device 170 that specifies a sensor supported by the client device 170.

In various embodiments, the content replacement part management system 140 also stores defined actions in the defined action store 146. The defined actions may be stored in local memory (volatile, non-volatile, or both). As one example, a defined action is a set of executable computer-readable instructions that are able to be executed when a corresponding interaction pattern is matched. For example, the set of executable instructions may instruct a processor to retrieve a web page.

Additional details regarding the insertion of content replacement parts is described in U.S. patent application Ser. No. 15/204,986 filed on Jul. 7, 2016, which is hereby incorporated by reference in its entirety.

Example Content Replacement System

The content replacement system 130 may include an electronic device or collection of electronic devices that replaces content in content streams with content replacement parts received from the content replacement part management system 140. The content replacement system 130 may include a content replacement engine 132 and an interaction handler module 134. In some embodiments, the content replacement system 130 and the content replacement part management system 140 are the same entity.

The content replacement engine 132 replaces content in content items to present customized content items that include replacement parts to a user of a client device 170. The content replacement engine 132 receives one or more original content items from one or more original content systems 180. These original content items, as described previously, may be audio streams, or may be other forms of content (e.g., video, interactive, text and graphics based), may be in one of many playback formats, and may be associated with various metadata.

The original content item may include content replacement break markers, which are indicated by start and end indicators. The section of content of an original content item in between the start and end indicators is a section which the original content system 180 has indicated to be replaceable by a content replacement part. Thus, the content replacement system 130 can customize each content item to include replacement parts that are specifically tailored for a particular user of a client device 170.

The content replacement engine 132 may determine the start and end indicators for the original content item using different methods depending on the type of start and end indicators within the live content stream 182. In one embodiment, the content replacement engine 132 detects the start and end indicators, which may be audio signals as described above, using machine learning, Fourier Transforms, Fast Fourier Transforms, and/or the Goertzel algorithm in the content item as received from the original content system 180. This allows the content replacement engine 132 to perform the corresponding logic (e.g., replacement with content replacement parts) for the start and respectively end events.

When receiving the original content item, the content replacement engine 132 may detect a start indicator (e.g., using one of the methods described above), which indicates the start of a content replacement break. Upon detecting the start of the content replacement break, the content replacement engine 132 requests one or more content replacement parts from the content replacement part management system 140. To request these content replacement parts from the content replacement part management system 140, the content replacement engine 132 may submit information about the user of the client device 170, such as the user's demographics, content consumption history, and information about the content item, such as its genre, name, etc. In some embodiments, the content replacement engine 132 requests the content replacement parts prior to identifying the content replacement breaks in the original content item.

As described in further detail below, in response to the request by the content replacement engine 132 for content replacement parts, the content replacement engine 132 receives, as a response from the content replacement part management system 140, one or more content replacement parts. These content replacement parts are content items submitted by content providers (e.g., sponsored content providers) and other entities.

The content replacement engine 132 inserts the content replacement parts based on the content replacement break markers in the original content item. The content replacement parts may be inserted according to the order in which the content replacement parts were received from the content replacement part management system 140. The content replacement engine 132 inserts the first content replacement part in to the original content item after the content replacement break marker indicating the start of the content replacement break. The content replacement engine 132 further inserts into the original content item each content replacement part after the end of the previous content replacement part. Thus, the content replacement parts are inserted consecutively from the start indicator of the content replacement break marker. The content replacement engine 132 inserts the content replacement parts until it detects the end indicator of the content replacement break marker in the content item.

In addition to the content replacement parts, the content replacement system 130 may also receive an interaction pattern as well as a defined action to be executed when the interaction pattern is matched. The content replacement system 130 may receive this information from the content replacement part management system 140. In other embodiments, the content replacement system 130 receives this information from the original content system 180 or a different third party system. In another embodiment, the content replacement system 130 may have previously generated an interaction pattern and retrieves the interaction pattern and an associated defined action from a stored location. In an embodiment, the content replacement system 130 sends the original content item with the replaced content parts, the interaction pattern, and the defined action to the client device 170 of the user.

The interaction pattern corresponds to a signal detected by a sensor or component of a client device 170 that indicates a particular user interaction. For example, a user interaction may include, but is not limited to shaking a client device, tapping on the case of a device, tilting the device in a particular orientation, tapping on the device screen, drawing a gesture on a screen, holding an object in proximity to a sensor of the device, providing a sound input to the device, providing a temperature change input, taking a picture using a camera of the device, providing a fingerprint, providing an input on an input mechanism of the device. For example, the user interaction of shaking the phone may be specified using a signal pattern for an accelerometer of the phone. Specific sensors of a client device 170 are discussed further below. In various embodiments, the content replacement system 130 may send information regarding a user and the client device 170 in order to receive an appropriate interaction pattern. For example, the content replacement system 130 may send user interactions that this particular user has performed in the past (e.g. shake the client device 170). Therefore, the content replacement system 130 may receive interaction patterns that specify user interactions that the user is able to perform on the client device 170. In another example, the content replacement system 130 may send a device identifier corresponding to the client device 170. Therefore, the content replacement system 130 receives interaction patterns that may be more appropriately tailored for a particular client device 170. For example, a client device may not have an accelerometer but does have a microphone. The appropriate interaction pattern would specify a user interaction with the microphone (e.g. say a particular word into the microphone) as opposed to a user interaction that requires an accelerometer (e.g. shake the client device).

The interaction pattern may be expressed in the time domain with particular signal amplitudes that are to be matched. For example, an interaction pattern may specify signal of the accelerometer at a particular sequence of amplitudes over a period of time. Alternatively, the interaction pattern may be expressed in the frequency domain as a threshold number of frequencies in signal or a number of Fourier or Cepstrum coefficients.

In some embodiments, these interaction patterns are generated based on empirical data analysis. For example, previous experiments may be conducted with a variety of client devices 170. A variety of users may be instructed to "shake" the client device 170 over multiple trials (e.g. hundreds of trials) and features (e.g. signal amplitude, Fourier coefficients, Cepstrum coefficients) may be extracted from each of the trials. As one example, the interaction patterns may be generated based on the averages of these extracted features. Additionally, each interaction pattern may have an appropriate range of deviation based on these empirical trials to minimize false positives.

In various embodiments, the interaction pattern can only be matched by a user interaction that is detected while a content replacement part of the content item is being played by the client device 170. For example, the content presenter 172 of a client device 170 may play a portion of a content item that is from the original content item (e.g., not a content replacement part). Therefore, the signal analysis module 174 does not monitor the signals detected by the sensors of the client device 170. This helps to reduce the number of false positives that may occur. Additionally, this helps preserve battery life of the client device 170 if the client device 170 uses a battery, because the client device 170 only needs to track the signals received by the sensors in response to the content replacement part being presented as opposed to tracking the signals received by the sensors of the client device 170 at all times.

In some embodiments, the content replacement system 130 may receive more than one interaction pattern for a content replacement part. For example, a content replacement part may be associated with an interaction pattern that specifies a shake of the client device 170 and a second interaction pattern that specifies a drawn symbol on the screen of the client device 170. In this example, the client device 170 deems the interaction pattern as matched if it receives either the shake or the drawn symbol. In some embodiments, the interaction pattern is matched only if both the shake and drawn symbol are detected.

To determine whether an acquired data is a match, the interaction pattern may be associated with a pre-determined threshold score generated by the content replacement system 130. For example, the threshold score represents a similarity score between the acquired data and the interaction pattern such that if the similarity score is above the threshold, the acquired data is a match.

In various embodiments, in addition to being associated with a content replacement part and a pre-determined threshold score, each interaction pattern may be further associated with one or more defined actions. Each defined action may be an executable set of instructions such as a set of executable code that is executed when the interaction pattern is matched. For example, the defined action may include instructions to retrieve additional content related to information in the content replacement part. The defined action causes the client device 170 to send a request for a universal resource locator (URL) and to direct a web browser of the client device 170 to the URL. Therefore, when the user of the client device 170 accesses the client device 170 at a subsequent time point (e.g. after unlocking his/her phone), the accessed URL is presented to the user on the client device 170. Other examples of a defined action include, but are not limited to, causing the client device 170 to send a request to contact the user. For example, the request may specify to call the user, to text the user, or to send an email to the user.

If a match occurs, the interaction handler module 134 of the content replacement system 130 may receive a notification from the client device 170 that the match occurred. The interaction handler module 134 may use the notification to update a database that describes the performance of the content replacement item. For example, the interaction handler module 134 may update the statistics of the content replacement item to demonstrate that a user has expressed interest in the content replacement item. The content replacement system 130 can provide this feedback to the content replacement part management system 140. Thus, in the future, the content replacement part management system 140 can continue to select content replacement parts that are similar or related to the content replacement part to which the user provided a matching user interaction.

Example Client Device

The client devices 170 are electronic devices used by users to perform functions such as consuming digital content, executing software applications, browsing websites hosted by web servers on the network 190, downloading files, and interacting with content provided by the content replacement system 130. For example, the client devices 170 may include dedicated e-readers, smartphones, wearables (e.g., smartwatches or pendants), or tablets, laptops, or desktop computers configured similar to an exemplary machine (or computing system) described with FIG. 6. A client device 170 may include one or more executable applications, such as a web browser, to interact with services provided by the content replacement system 130. Although two client devices 170 are illustrated in FIG. 1, in other embodiments the environment 100 may include fewer (e.g. one) or more client devices 170.

In one embodiment, a client device 170 includes a content presenter 172. This may be a software application executed on the client device 170, a hardware component of the client device 170, or a combination of both. The content presenter 172 may submit requests to the content replacement system 130 for a content item, such as an audio content item or audio stream. The content presenter 172 may select one of the content items in the selection of content items. In response to these requests, the content replacement system 130 provides the content presenter 172 with a content item which may then be presented to a listener of the client device 170.

As one example, the client device 170 may be an entertainment system in a vehicle, and the content presenter 172 may be an integrated component in the entertainment system that may request a content item via a wireless connection from the content replacement system 130 for presentation to a listener, in this case, the driver or passengers of the vehicle.

In various embodiments, the client device 170 may also include a signal analysis module 174 responsible for detecting a user interaction. The signal analysis module 174 receives an interaction pattern associated with the content item from the content replacement system 130 and a defined action that is to be executed if a match with the interaction pattern is detected. As a content item is played by the client device, the signal analysis module 174 recognizes the break markers in the content item that indicate the beginning and end of a replacement part. When a replacement part is played by the client device, the signal analysis module 174 begins detection of signals from one or more sensors that are specified in the interaction template.

Sensors of a client device 170 that detect a user interaction may include, but are not limited to, an accelerometer, a gyroscope, a capacitive or resistive screen, a proximity sensor, a microphone, a temperature sensor, a camera, a fingerprint sensor, and one or more input mechanisms or buttons.

As more specific examples regarding the accelerometer of the client device 170, the interaction pattern may specify one or more of the following data elements:

The linear acceleration of one or more axes from one or more points of the device;

The linear velocity of one or more axes from one or more points of the device; and The angular velocity of one or more axes from one or more points of the device.

In various embodiments, the signal analysis module 174 analyzes the received signals to determine whether the user interaction corresponding to the received signals is a match with the interaction pattern. In other embodiments, the analysis is conducted by the content replacement system 130. For example, the signal analysis module 174 receives the signals and the client device 170 transmits the signals to the content replacement system 130 to be analyzed by the content replacement system 130.

The signal analysis module 174 compares the received signals to the interaction pattern to determine whether any of the received signals are a match to the interaction pattern. If a match occurs, the signal analysis module 174 executes the received defined action. Following execution of the defined action, the client device 170 sends a notification to the content replacement system 130 of the matched interaction pattern and executed defined action. Further discussion regarding the signal analysis process is discussed below in reference to FIG. 4.

Although the above description is made with reference to listeners, audio streams, and live content, it is not limited to such and may be applied to other content, such as video and interactive content, and to non-live content.

Additional details regarding the method described above are described in further detail with regards to FIGS. 2-5.

Example Interaction Diagram for Detecting User Interest in a Content Item

Figure 2A:
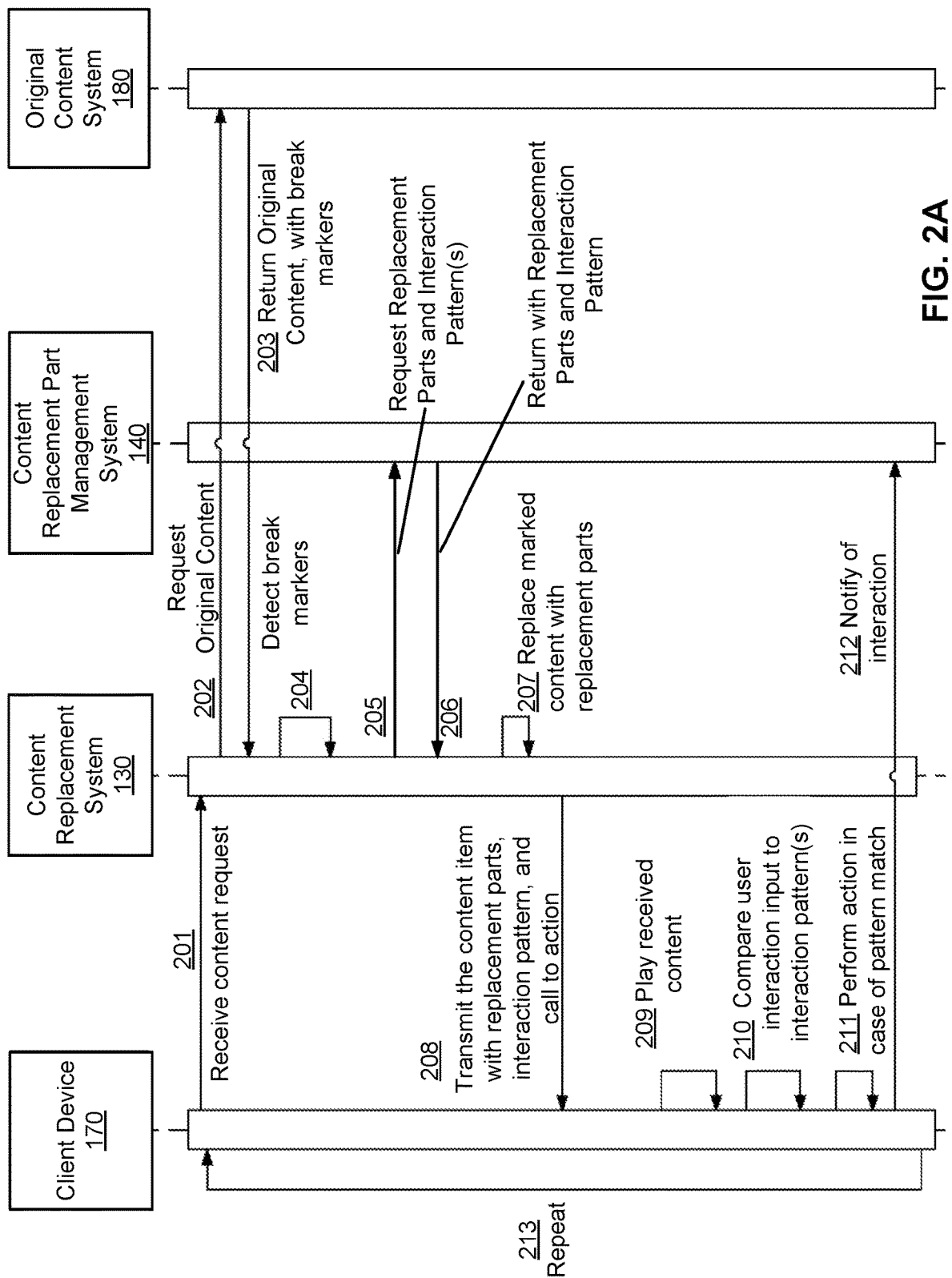
FIG. 2A illustrates an interaction diagram for detecting user interest associated with a delivered content item between a client device, a content replacement system, a content replacement part management system, and an original content system, according to one embodiment.

FIG. 2A illustrates an interaction diagram for detecting user interest associated with a delivered content item between a client device, a content replacement system, a content replacement part management system, and an original content system, according to one embodiment.

In various embodiments, the steps of the method 200 may be performed in parallel, in different orders, or may include different steps altogether. Also, it is noted that in one example embodiment the steps and/or modules may be embodied as instructions, e.g., instructions 624, that may be executed by the processor 602 described with respect to FIG. 6.

A client device 170 may send a request for content, which is received 201 by the content replacement system 130. The content replacement system 130 may request 202 original content from an original content system 180. The original content system 180 returns 203 the original content with one or more break markers in the original content or in the metadata associated with the original content. The content replacement system 130 detects 204 the one or more break markers in the original content and may request 205 content replacement parts for insertion into the original content. Additionally, the content replacement system 130 also requests 205 an interaction pattern, as described above. In various embodiments, the request for the replacement parts and the interaction pattern may include additional information about the user associated with the client device 170 that sent the initial content request at step 201. For example, the additional information may include user characteristics (e.g. user's age, gender, location), device characteristics (e.g. the device's unique identifier, manufacturer, operating system, software versions, battery status), and network information associated with the device (e.g. internet protocol address, connection type).

The content replacement part management system 140 receives this request and utilizes the additional information to return 206 (i.e., reply with) the content replacement parts and the interaction pattern. For example, the content replacement parts may be selected based on targeting criteria that match the characteristics of the user, device, or network. The interaction pattern may also be selected based on the additional information. For example, different devices have different sensors and thus, the content replacement management system 140 returns an interaction pattern specifically tailored for the device.

The content replacement part management system 140 also transmits, in some embodiments, a defined action that is to be executed when the interaction pattern is matched.

The content replacement system 130 replaces 207 the content indicated by the break markers with the received content replacement parts. In various embodiments, the content replacement system 130 may request 205 content replacement parts and interaction patterns before detecting 204 a break marker, such that the replacement parts can be rapidly inserted into the original content when the break markers are detected 204. In other words, step 204 may be interchanged with steps 205 and 206.

The content replacement system 130 transmits 208 the content item with the content replacement parts, the interaction pattern, and the defined action to the client device 170. The client device 170 plays 209 the content item according to technical information specified in an associated metadata file (e.g. bit rate). When the client device 170 plays a content replacement part, one or more components of the client device 170 detect user interactions in response to the played content replacement part. The client device 170 compares 210 the detected user interactions to the received interaction pattern to determine if there is a match. In the event that there is a match, the client device performs 211 the defined action. An example of a defined action may be the client device 170 executing a set of instructions to retrieve a web page with a particular URL. In various embodiments, the client device 170 notifies 212 the content replacement part management system 140 that a match occurred and that the action was performed. If playback of the content item is completed, the client device may repeat 213 the previous steps (e.g. start again at step 201) by sending a new content item request that is received 201 by the content replacement system 130.

In other embodiments, the playback of the content item may not be fully completed as portions of the content item remain to be played. The portions of the content item may include additional content replacement parts. Therefore, the client device 170 may continue playing 209 the received content until the client device 170 recognizes the next content replacement part. If signals corresponding to a user interaction are received from a sensor of the client device 170, the client device undergoes the process of comparing 210 the user interaction input to the interaction pattern and performs 211 the defined action upon a match. The process repeats until all portions of the content item are played.

Figure 2B:
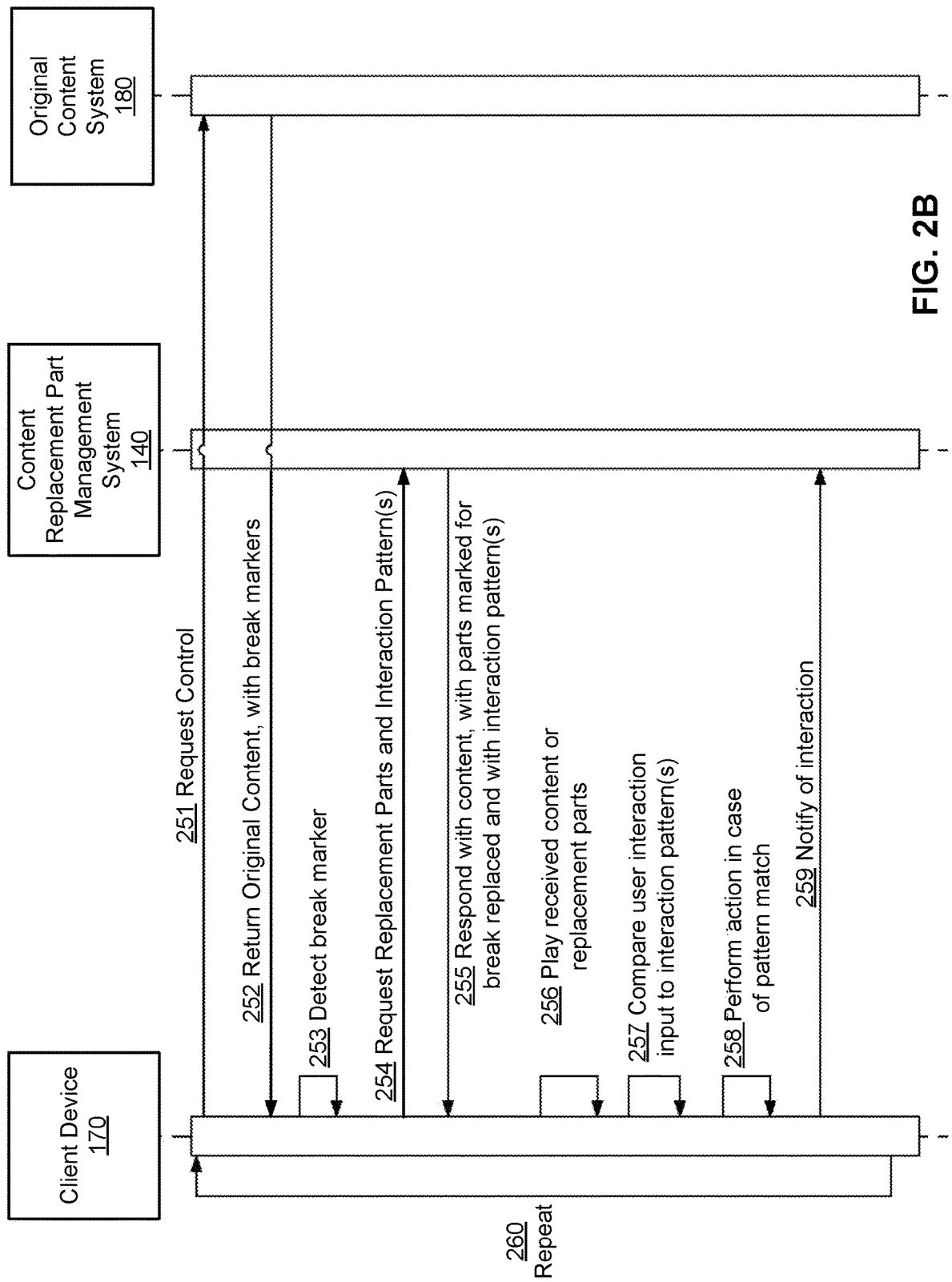
FIG. 2B illustrates an interaction diagram for detecting user interest associated with a delivered content item between a client device, a content replacement part management system, and an original content system, according to one embodiment.

FIG. 2B illustrates an alternative interaction diagram embodiment that includes a client device, a content replacement part management system, and an original content system, according to one embodiment. In this embodiment, the client device 170 executes the steps (e.g. requesting 251 original content, detecting 253 break marker, requesting 254 replacement parts) that were previously executed by the content replacement system 130. In other embodiments (not shown), the content replacement part management system 140 executes the steps (e.g. requesting 251 original content, detecting 253 break marker, requesting 254 replacement parts).

Example Flow Diagram for Detecting User Interest by the Client Device

Figure 3:
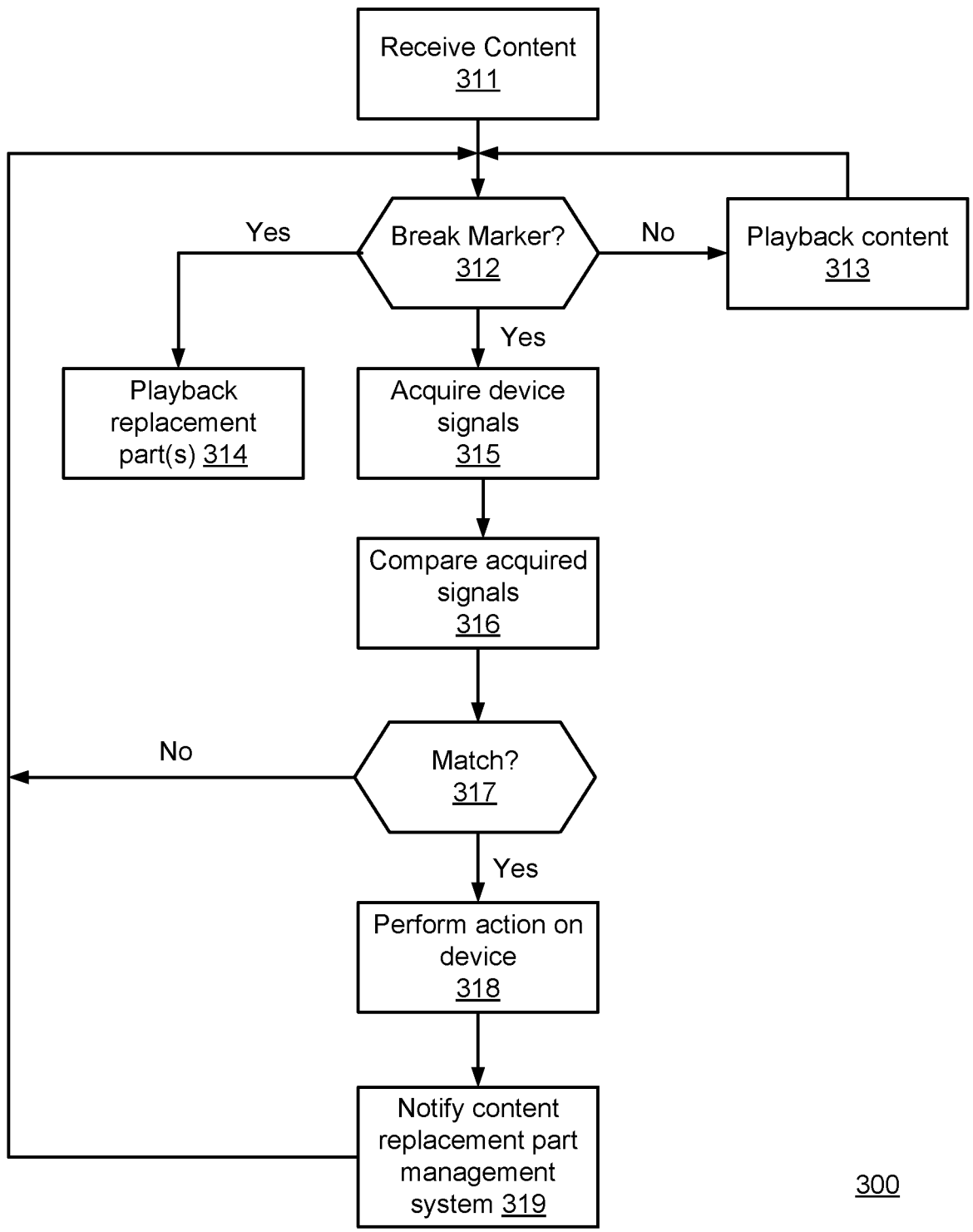
FIG. 3 illustrates a flow diagram describing the overall process of detecting user interest associated with a delivered content item by a client device, according to one embodiment.

FIG. 3 depicts a flow diagram describing the overall process of detecting user interest associated with a delivered content item by a client device 170, according to one embodiment. The scenario described in FIG. 3 is for the purposes of clarifying and exemplifying the above description with regards to steps 208-212 as described in FIG. 2A, but is not intended to limit the description only to the scenario as depicted.

The client device 170 receives 311 content including a content item with content replacement parts, an interaction pattern, and a defined action. In some embodiments, the content item is a stream of content with multiple content replacement parts embedded at different time points within the content stream. During playback, the client device 170 checks 312 whether the current content item is associated with a break marker which indicates the presence of a content replacement part. If a break marker is not present, the content presenter 172 plays back 313 the content. In various embodiments, the content is a stream and the client device continues to receive content and break markers indicating content replacement parts. Thus, the client device 170 returns to continue checking 312 for the existence of a break marker that may have been received after the initial stream started playing. Once a break marker is detected, the content presenter 172 plays back 314 the replacement part. In parallel, the detection of a breaker marker triggers the components of the client device 170 to acquire 315 signals corresponding to user interactions with the client device 170. The acquired signals are recorded into its local memory (volatile, non-volatile, or both).

The signal analysis module 174 compares 316 the acquired signals to the received interaction pattern to determine whether there is a match 317 between the acquired signals and the signal pattern specified in the interaction pattern. In some embodiments, the comparison is conducted in real-time as the signal is acquired. In other embodiments, the signal is compared to the interaction pattern after the content replacement part has finished playing on the client device 170. If no match occurs, the system returns to checking for a breaker marker for the next content replacement part. If a match with the interaction pattern is identified, the client device 170 performs 318 the previously received defined action. A match between the signal acquired by a sensor of the client device 170 and the interaction pattern may be deemed to occur when the similarity between them is above a certain pre-determined threshold. In some embodiments, the client device 170 further notifies 319 the content replacement part management system 140 or the content replacement system 130 that a match with the interaction diagram occurred and the defined action was executed.

Example Signal Analysis

Figure 4:
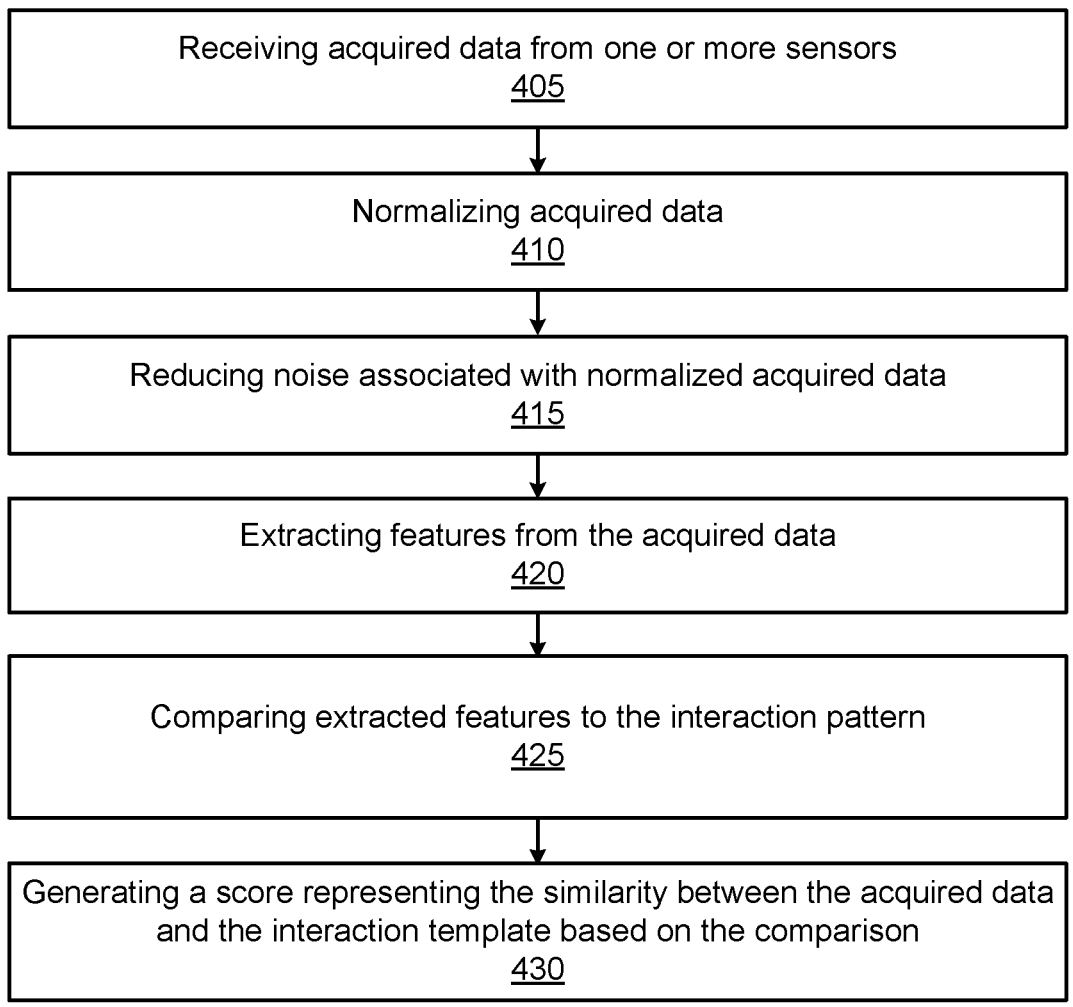
FIG. 4 illustrates a flow diagram for comparing the acquired signals to determine user interest, according to one embodiment.

FIG. 4 illustrates a flow diagram detailing the comparison 316 of the acquired signals with the interaction pattern, according to one embodiment. In some embodiments, the steps detailed in FIG. 4 are executed by the signal analysis module 174 of the client device 170. In some embodiments the steps may be performed in parallel, in different orders, or with different steps. Also, it is noted that in one embodiment the steps and/or modules may be embodied as instructions, e.g., instructions 624, that may be executed by the processor 602 described with respect to FIG. 6. In another embodiment, the instructions are included with the interaction pattern and are provided to the client device 170 by the content replacement system 130.

The signal analysis module 174 receives 405 the acquired data from one or more sensors. In various embodiments, the acquired data is previously stored and the signal analysis module 174 retrieves the acquired data from a storage medium (e.g. volatile, non-volatile, or both) located on the client device 170. In various embodiments, the signal analysis module 174 normalizes 410 the acquired data so that the acquired data is comparable to the interaction pattern. Normalization of the data is a necessary step to account for differences in sensors of different devices (e.g. different calibration, resolution, sensitivity). Additionally, the normalization may account for differences in the sampling frequency of different sensors. The interaction pattern may have associated metadata information that details the characteristics of the interaction pattern (e.g. amplitude in the time domain, frequency in the frequency domain) such that the signal analysis module 174 can readily normalize the acquired data from the sensors to compare to the interaction pattern. For example, normalization algorithms include linear/non-linear normalization, feature scaling and dynamic range compression or expansion.

The signal analysis module 174 reduces 415 the noise associated with the acquired data. As one example, the signal analysis module 174 may apply an appropriate low-pass, band-pass, high-pass filter, or a combination thereof, to eliminate noise associated with the acquired signal. The acquired data signals that undergoes signal normalization and noise reduction is hereafter referred to as processed data signals.

The signal analysis module 174 extracts 420 features from the processed data signals to be used to compare to the interaction diagram. For example, the signal analysis module 174 may obtain the processed data signals that are in the time domain (e.g. signal amplitude vs. time). In some embodiments, the signal analysis module 174 may directly extract features of the processed data signals from the time domain including, but not limited to, the maximum signal amplitude or signal duration.

In some embodiments, the signal analysis module 174 conducts a Fourier or Fast Fourier Transform to express the processed data signal in the frequency domain. In one embodiment, the signal analysis module 174 extracts the Fourier coefficients associated with the processed data signal in the frequency domain as the extracted features. In another embodiment, the signal analysis module 174 extracts a threshold number of the largest frequency components of the processed data signal.

In some embodiments, the signal analysis module 174 may conduct a Cepstral or Cepstrum analysis of the processed data signal. The signal analysis module 174 may truncate the cepstrum at specific quefrency values depending on the sensor that acquired the data. Furthermore, the signal analysis module 174 extracts the cepstral coefficients (e.g. mel-frequency cepstral coefficients) to be compared to the cepstral coefficients specified by the interaction pattern. One skilled in the art can readily envision other features that may be extracted using Fourier analysis, Cepstrum analysis, or other standard signal processing methods.

The signal analysis module 174 compares the extracted features to the interaction pattern. As one example, if the extracted features were from the time domain (e.g. signal amplitude, signal duration), the signal analysis module 174 may use dynamic time warping to compare the extracted features to the features specified by the interaction pattern. For example, the signal analysis module 174 may extract multiple signal amplitudes from the processed data signal that each correspond to a time point. The signal analysis module 174 may iteratively apply the dynamic time warping algorithm to warp the time axis to align the extracted time-dependent features of the processed data signal and the interaction pattern.

In other embodiments, the signal analysis module 174 may apply the Damerau Levenshtein Distance algorithm to compare the extracted features of the processed data signal with the interaction pattern. As one example, the extracted Fourier or cepstral coefficients of the processed data signal are compared to the coefficients specified by the interaction pattern. The comparative "distance" between the processed data signal and the interaction pattern may be the number of Fourier or Cepstral coefficients that exist in one but not the other.

In other embodiments, the signal analysis module 174 may apply cross-correlation and/or autocorrelation methods to compare the processed data signal and the interaction pattern. For example, a cross-correlation analysis can yield a time delay between the processed data signal and the interaction pattern. In some embodiments, the cross-correlation analysis yields aligned peaks and/or aligned troughs. Similarly, an auto-correlation analysis of either the processed data signal or the interaction pattern may also reveal aligned peaks and/or aligned troughs. A comparison between the peaks and troughs of the cross-correlation and the peaks and troughs of the auto-correlation can also yield an understanding of the similarity between the two signals.

In various embodiments, in order to determine whether the detected signal is a match with the interaction pattern, the signal analysis module 174 first identifies a signal segment that is a potential match with the interaction pattern. This is due to the fact that the interaction pattern is, in most cases, shorter in length as compared to the length of the full signal recorded by a sensor of the client device 170. In various embodiments, the signal analysis module 174 identifies signal segments that have an average amplitude that significantly differs from a baseline value in order to eliminate long signal segments that may be irrelevant. For example, if the interaction pattern specifies a "shake" of the client device, the baseline signal may correspond to the accelerometer signal when the client device 170 is at rest (e.g. no movement). In other embodiments, the signal analysis module 174 identifies sudden changes (e.g. transitions) in the signal pattern. For example, if the signal detected by an accelerometer is initially non-existent (e.g. at rest) and suddenly changes, the signal analysis module 174 identifies the sudden change and begins comparing the interaction pattern to the obtained signal beginning at the sudden transition.

Following the comparison of the extracted features to the interaction pattern, the signal analysis module 174 generates 430 a similarity score that represents the similarity between the processed data signal and the interaction pattern. In various embodiments, the signal analysis module 174 deems the processed data signal a match to the interaction pattern if the similarity score is above a certain pre-determined threshold. In some embodiments, the threshold score is determined through a previously undertaken empirical analysis of sample data provided by users. For example, an empirical analysis may involve users may that shake their client device 170 and observe how many false positives or false negatives occur. The interaction pattern may be altered based on the results obtained by the empirical analysis. As one example, the threshold score is set to ensure that the false positive rate is less than 1% and the false negative rate is less than 5%. In one scenario, the threshold similarity score may be set to 60% (out of 100%), such that the acquired data from a sensor that is associated with a score above a 60% threshold score is categorized as a match with the interaction pattern.

In some embodiments, the threshold score is determined and updated over time using a machine learning model. The machine learning model may be first implemented by the content replacement system 130 when the threshold score was originally generated. For example, the content replacement system 130 may set the threshold similarity score of a particular defined action to be 60%. Therefore, acquired data from sensors of the client device 170 that have above a 60% similarity score are a match and causes the client device 170 to execute the defined action. As an example, the defined action may cause the client device 170 to send a request to the content replacement system 130 for a URL. Therefore, the content replacement system 130 is able to track the behavior of users that access the URL. The tracked behavior of users that access the URL may be utilized as an input to the machine learning model to adjust the threshold score. For example, if a large majority of client devices 170 are deemed a match with the interaction pattern but take no further action when presented the URL, the machine learning model may interpret a proportion of these individuals to be false positives and may increase the threshold score to 65%. Therefore, false positives that may occur between similarity scores of 60 and 65% are eliminated. As another example, the content replacement system 130 tracks the amount of time that a user spends on the web page corresponding to the presented URL. If a large majority of client devices 170 access the web page and immediately leave, it is highly likely that these users are false positives. Therefore, the machine learning model can similarly adjust the threshold score upwards.

Process for Detecting User Interest in a Delivered Content Item

Figure 5:
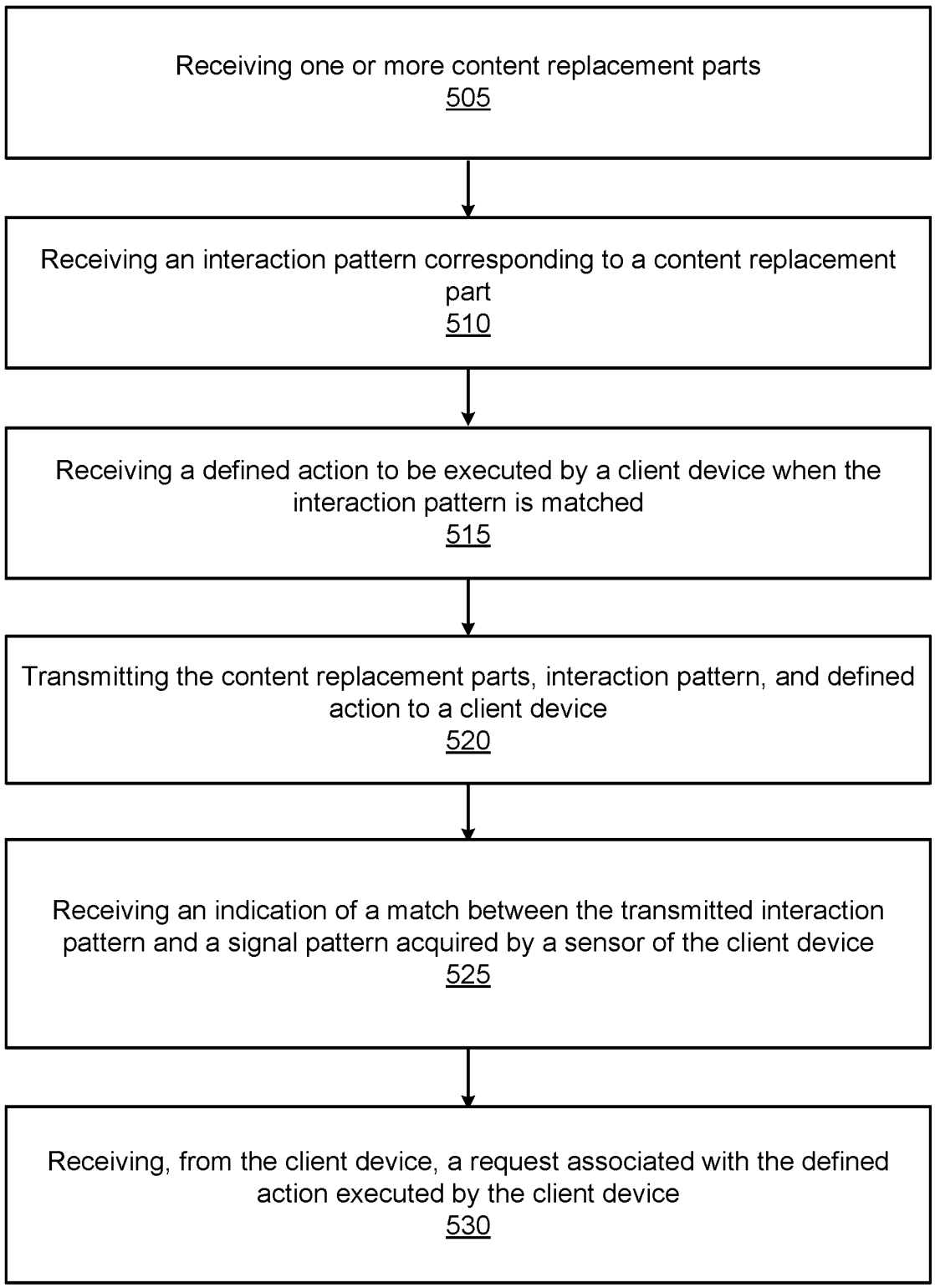
FIG. 5 illustrates a flow diagram of the steps executed by the server for detecting user interest in a delivered content item, according to one embodiment.

FIG. 5 depicts a flow diagram of the steps executed by the server for detecting user interest in a delivered content item, according to one embodiment.

The content replacement system 130 receives 505 one or more content replacement parts to be inserted into an original content item. The content replacement system 130 also receives 510 an interaction pattern corresponding to a content replacement part. The content replacement system 130 may also receive 515 a defined action that is to be executed by the client device when the received interaction pattern is matched. The content replacement system 130 transmits the content replacement parts, the interaction template, and the defined action to a client device 170. In some embodiments, the one or more content replacement parts are included within a content item that was originally obtained by the content replacement system 130 from the original content system 180. The content replacement system 130 receives 525 an indication that a match occurred between the transmitted interaction pattern and a signal pattern that was acquired by a sensor or component of the client device 170. In various embodiments, the indication of a match may include the similarity score generated by the client device 170 that represents how similar the acquired data is to the interaction pattern.

In some embodiments, the content replacement system 130 also receives 530 a request from the client device 170 that is associated with the defined action executed by the client device 170. For example, the request may be to access a web page hosted by the content replacement system 130 that has more information regarding particular content that was presented to the user in a content replacement part.

In various embodiments, the content replacement system 130 is responsible for comparing the signals recorded by a sensor of the client device 170 to determine whether a match has occurred. For example, the content replacement system 130 receives 505 content replacement parts, receives 510 an interaction pattern for each content replacement part, and receives 515 a defined action. However, the content replacement system 130 may only transmit the content replacement parts to the client device 170. The sensors of the client device 170 record user interactions (e.g. signals detected by the sensors) performed on the client device 170 while the content replacement parts are played on the client device 170. The content replacement system 130 receives these signals and compares each signal to the interaction pattern to determine whether there is match. If a match occurs, the content replacement system 130 may transmit a defined action to the client device 170 with instructions for the client device 170 to execute the defined action.

Example Machine Architecture

Figure 6:
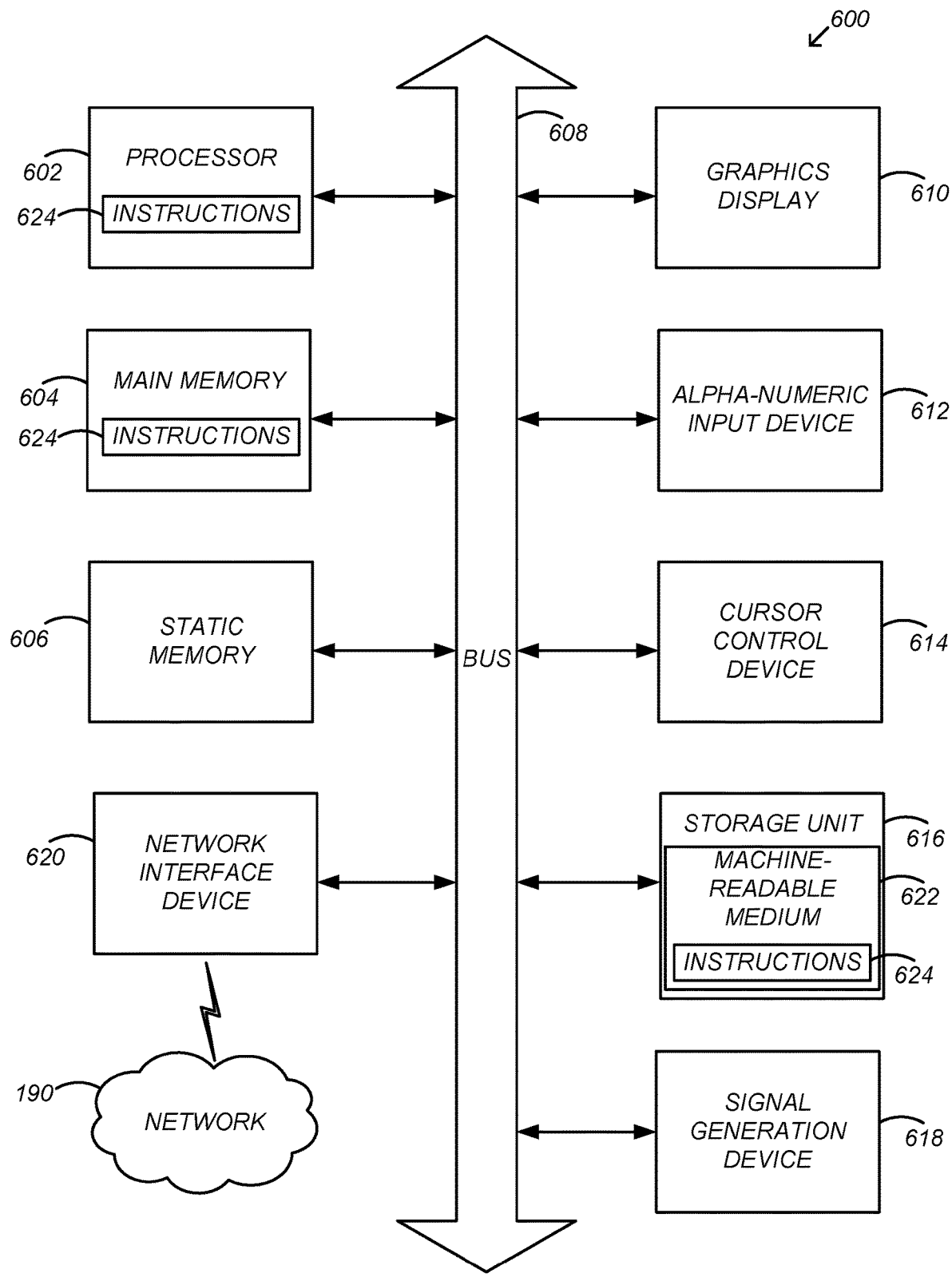
FIG. 6 is a block diagram illustrating components of an example machine able to read instructions from a machine-readable medium and execute them in a processor (or controller).

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment. The computer system 600 is used to execute the processes and functionality described in FIGS. 1-5. It is noted that the computer system 600 is exemplary and that not all the components described herein may be necessary to execute the processes as described above.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604 and the storage unit 616 communicate via a bus 608.

In addition, the computer system 600 can include a static memory 606, a display driver 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 190 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The system as disclosed provides benefits and advantages that enable a user of a client device to demonstrate interest in a content item while passively consuming the content item (e.g. without unlocking the screen of a device and without providing). For many users, this implementation enables them to access interesting information associated with a presented content item that would otherwise be lost because the user did not have enough time to express interest in the content item or because the user did not pursue the option of expressing interest due to the hurdle of unlocking and accessing the client device.

As an additional benefit, the implementation of this system also enables content providers to more accurately measure the performance of the content items that are presented to users. For example, conventional content providers may receive information indicating that content items that are short in duration perform poorly when presented to users.

However, this may be because users that are passively consuming the content item are unable to access their client devices and express interest fast enough before the content item finishes. With this system, users that are passively consuming the content can immediately express interest through easily accessible user interactions (e.g. shaking the phone, tilting the phone). Content providers that select the content to be presented to the user can obtain a more accurate understanding of the performance of the content item.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-6. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., 602) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software (e.g., instructions 624) to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors 602 or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 604). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for detecting user interest in a provided content item through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   accessing, by a content replacement system, one or more content replacement parts;
   accessing, by the content replacement system, an interaction pattern corresponding to a content replacement part of the one or more content replacement parts, the interaction pattern received separately from a third party system for each content replacement part, the interaction pattern corresponding to a physical interaction with a client device while the client device is locked;
   accessing, by the content replacement system, a defined action associated with the content replacement part, wherein the defined action is received separately from the third party system for each content replacement part, and wherein the defined action is executed by the client device responsive to a match with the interaction pattern occurring, the match occurring responsive to a similarity score representing a similarity between the interaction pattern and a signal acquired by at least one sensor of the client device being above a score threshold;
   transmitting the content replacement part, the interaction pattern, and the defined action in a message to the client device, wherein the content replacement part is presented by the client device to a user of the client device responsive to a break marker of a content item being reached, the break marker specifying a time point in the content item, wherein at least a portion of the content item is replaced with the content replacement part, the portion indicated by the time point specified by the break marker, wherein the content replacement part instructs the user to perform a user interaction to demonstrate interest in content of the content replacement part, and wherein the message instructs the client device to acquire the signal from the at least one sensor of the client device to match to the interaction pattern responsive to the client device is presenting the content replacement part to the user of the client device, the signal from the at least one sensor recording the user interaction; and
   receiving, from the client device, an indication of the match between the transmitted interaction pattern and the signal acquired by at least one sensor of the client device, the match determined by the client device during a period of time in which the client device presents the content replacement part to the user, and wherein the client device executes the defined action upon determining the match between the transmitted interaction pattern and the signal.

2. The method of claim 1 further comprising:
   receiving, from the client device, a request associated with the defined action executed by the client device.

3. The method of claim 2, wherein the request is sent by the client device and is for at least one of retrieving additional information related to the content replacement part corresponding to the interaction pattern, and contacting a user of the client device.

4. The method of claim 1, wherein the signal is acquired by the at least one sensor of the client device during the same period of time as when the content replacement part of the content item is presented on the client device.

5. The method of claim 1, wherein the interaction pattern specifies a signal pattern received by one or more sensors of the client device that corresponds to a user interaction provided by a user of the client device on the client device.

6. The method of claim 5, wherein the user interaction is one or more of: shaking the client device, tapping on the client device, tilting the client device in a particular orientation, drawing a gesture on the client device, holding an object in proximity to a proximity sensor of the client device, providing a noise input to the client device, providing a temperature change to the client device, providing a visual image, and providing a fingerprint.

7. The method of claim 1, wherein the at least one sensor of the client device is one of an accelerometer, gyroscope, capacitive screen, resistive screen, temperature sensor, microphone, camera, button, and fingerprint sensor.

8. The method of claim 1, wherein the interaction pattern further comprises instructions that, when executed, causes the client device to:
   acquire one or more signals by at least one sensor of the client device;
   store the acquired one or more signals in a memory store on the client device;
   normalize the one or more acquired signals;
   reduce noise associated with the normalized one or more signals to generate one or more processed data signals;
   extract feature patterns from the one or more processed data signals;
   for each extracted feature pattern:
      compare the extracted feature pattern to the transmitted interaction pattern;
      generate a similarity score representing the similarity between the extracted feature pattern and the transmitted interaction pattern; and
      determine a match between the extracted feature pattern and the transmitted interaction pattern based on the similarity score being above a threshold value.

9. The method of claim 8, wherein the threshold value is determined based on previously conducted empirical analysis of sample data.

10. The method of claim 1, wherein the interaction pattern further comprises instructions that, when executed, causes a content replacement system to:
receive, from the client device, one or more signals acquired by at least one sensor of the client device;
store the acquired one or more signals in a memory store;
normalize the one or more acquired signals;
reduce noise associated with the normalized one or more signals to generate one or more processed data signals;
extract feature patterns from the one or more processed data signals;
for each extracted feature pattern:
compare the extracted feature pattern to the interaction pattern;
generate a similarity score representing the similarity between the extracted feature pattern and the interaction pattern; and
determine a match between the extracted feature pattern and the interaction pattern based on the similarity score being above a threshold value.

11. A non-transitory computer-readable medium comprising computer program code, the computer program code when executed by a processor of a client device causing the processor to perform steps including:
accessing, by a content replacement system, one or more content replacement parts;
accessing, by the content replacement system, an interaction pattern corresponding to a content replacement part of the one or more content replacement parts, the interaction pattern received separately from a third party system for each content replacement part, the interaction pattern corresponding to a physical interaction with a client device while the client device is locked;
accessing, by the content replacement system, a defined action associated with the content replacement part, wherein the defined action is received separately from the third party system for each content replacement part, and wherein the defined action is executed by the client device when a match with the interaction pattern occurs, the match occurring when a similarity score representing a similarity between the interaction pattern and a signal acquired by at least one sensor of the client device is above a score threshold;
transmitting the content replacement part, the interaction pattern, and the defined action in a message to the client device, wherein the content replacement part is presented by the client device to a user of the client device when a break marker of a content item is reached, the break marker specifying a time point in the content item, wherein at least a portion of the content item is replaced with the content replacement part, the portion indicated by the time point specified by the break marker, wherein the content replacement part instructs the user to perform a user interaction to demonstrate interest in content of the content replacement part, and wherein the message instructs the client device to acquire the signal from the at least one sensor of the client device to match to the interaction pattern when the client device is presenting the content replacement part to the user of the client device, the signal from the at least one sensor recording the user interaction; and
receiving, from the client device, an indication of the match between the transmitted interaction pattern and the signal acquired by at least one sensor of the client device, the match determined by the client device during a period of time in which the client device presents the content replacement part to the user, and wherein the client device executes the defined action upon determining the match between the transmitted interaction pattern and the signal.

12. The non-transitory computer-readable medium of claim 11, further comprising computer program code that, when executed by the processor of the client device, causes the processor to perform steps including:
receiving, from the client device, a request associated with the defined action executed by the client device.

13. The non-transitory computer-readable medium of claim 12, wherein the request is sent by the client device and is for at least one of retrieving additional information related to the content replacement part corresponding to the interaction pattern and contacting a user of the client device.

14. The non-transitory computer-readable medium of claim 11, wherein the signal is acquired by the at least one sensor of the client device during the same period of time as when the content replacement part of the content item is presented on the client device.

15. The non-transitory computer-readable medium of claim 11, wherein the interaction pattern specifies a signal pattern received by one or more sensors of the client device that corresponds to a user interaction provided by a user of the client device on the client device.

16. The non-transitory computer-readable medium of claim 15, wherein the user interaction is one or more of shaking the client device, tapping on the client device, tilting the client device in a particular orientation, drawing a gesture on the client device, holding an object in proximity to a proximity sensor of the client device, providing a noise input to the client device, providing a temperature change to the client device, providing a visual image, and providing a fingerprint.

17. The non-transitory computer-readable medium of claim 11, wherein the at least one sensor of the client device is one of an accelerometer, gyroscope, capacitive screen, resistive screen, temperature sensor, microphone, camera, button, and fingerprint sensor.

18. The non-transitory computer-readable medium of claim 11, wherein the interaction pattern further comprises instructions that, when executed, causes the client device to:
acquire one or more signals by at least one sensor of the client device;
store the acquired one or more signals in a memory store on the client device;
normalize the one or more acquired signals;
reduce noise associated with the normalized one or more signals to generate one or more processed data signals;
extract feature patterns from the one or more processed data signals;
for each extracted feature pattern:
compare the extracted feature pattern to the transmitted interaction pattern;
generate a similarity score representing the similarity between the extracted feature pattern and the transmitted interaction pattern; and
determine a match between the extracted feature pattern and the transmitted interaction pattern based on the similarity score being above a threshold value.

* * * * *